United States Patent [19]

Cobes, Jr. et al.

[11] Patent Number: 5,538,094

[45] Date of Patent: Jul. 23, 1996

[54] PANEL REINFORCEMENT STRUCTURE

[75] Inventors: John W. Cobes, Jr., Lower Burrell; Dinesh C. Seksaria, Murraysville, both of Pa.

[73] Assignee: Aluminum Company of America, Pittsburgh, Pa.

[21] Appl. No.: 180,129

[22] Filed: Jan. 11, 1994

[51] Int. Cl.$^6$ .................................................. B62D 25/10
[52] U.S. Cl. ..................... 180/69.2; 52/787.12; 296/191; 296/146.6; 296/76
[58] Field of Search ................. 180/69.2, 69.21, 180/69.22, 69.23, 69.24; 296/189, 194, 185, 196, 202, 76, 146.6, 146.5, 146.11, 210, 191, 192; 49/381, 399; 428/615, 686; 52/787.1, 787.12, 782.1, 783.1

[56] References Cited

U.S. PATENT DOCUMENTS

| | | | |
|---|---|---|---|
| 3,505,996 | 2/1967 | Shapiro | 52/787.12 |
| 4,012,807 | 3/1977 | Kern | 180/69.2 |
| 4,186,476 | 2/1980 | Mair et al. | 180/69.21 |
| 4,290,235 | 9/1981 | Jahnle | 296/189 |
| 4,308,307 | 12/1981 | Heath et al. | 428/167 |
| 4,378,394 | 3/1983 | Miura et al. | 428/113 |
| 4,378,395 | 3/1983 | Asushina et al. | 296/189 |
| 4,451,077 | 5/1984 | Bruhnke | 180/69.2 |
| 4,634,167 | 1/1987 | Moriki et al. | 296/31 |
| 4,753,475 | 6/1988 | Mochida | 296/192 |
| 4,796,946 | 1/1989 | Wilson | 296/146.6 |
| 4,950,522 | 8/1990 | Vogt et al. | 428/73 |
| 5,000,997 | 3/1991 | Ritchie et al. | 180/69.2 |
| 5,054,567 | 10/1991 | Hoffman | 180/68.2 |
| 5,115,878 | 5/1992 | Hayata | 180/69.21 |
| 5,124,191 | 6/1992 | Seksaria | 428/178 |

FOREIGN PATENT DOCUMENTS 2621677  4/1989  France ................................. 296/191

*Primary Examiner*—Anne Marie Boehler
*Attorney, Agent, or Firm*—Dressler, Goldsmith, Shore & Milnamow, Ltd.; Thomas R. Trempus

[57] ABSTRACT

A panel member consisting of inner and outer interconnected panels, and reinforcement members placed therebetween to increase the strength of said panel in localized areas. The reinforcements consist of a structure made up of a base material of plastic or aluminum and an insert material of a hard metal. Loads are transferred to the panel through the metal insert material and dissipated to the panel members through the base structure. In the illustrated arrangements, the reinforcement members are used, for example, in the latch and hinge areas of car hoods.

12 Claims, 5 Drawing Sheets

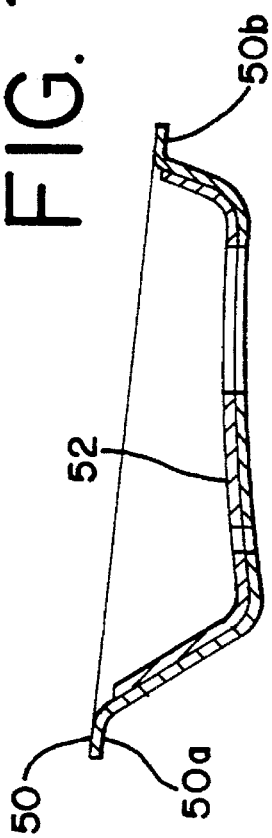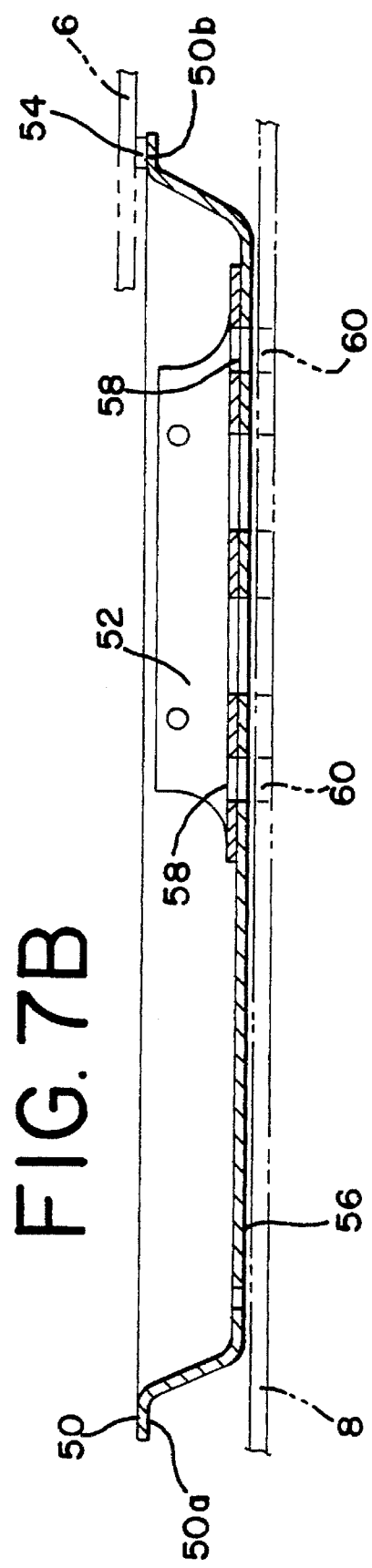

PANEL REINFORCEMENT STRUCTURE

TECHNICAL FIELD

The invention relates to a panel assembly composed of interconnected inner and outer members that resists deformation that is relatively light in weight and is suitably reinforced in localized areas, so that the assemblage will be sufficiently rigid to perform its intended function. It is particularly useful for automobile hoods.

BACKGROUND OF THE INVENTION

It has been conventional to make car hoods of two interconnected layers of sheet metal that are quite heavy, which has an obvious weight and cost disadvantage. The automobile industry is constantly looking for cost and weight reduction in these components without penalizing their function. This has heretofore been accomplished by reducing the gauge of the sheet metal used for the panel. If the material is less than a certain thickness, it may be difficult to handle. Moreover, if it is too thin, the panel will be incapable of functioning in the desired manner due to possible deformation and distortions when the panel is opened and closed. It results in particularly making the panel inadequate to function in the localized areas, such as near latches, hinges, or similar hardware attachment areas. Without stiffening up such areas, the panels deform and become misshapen which renders such a construction unacceptable. Of particular concern are the areas where the panel is latched to the front of the car just behind the grill and hinged at its rear to the main car structure. Without proper reinforcement in these areas, the hood will not have sufficient rigidity to adequately resist bending and distortion during opening and closing of the panel.

In a number of situations, the designer has attempted to overcome this problem by using reinforcement assemblies in the areas in question which generally consist of several individually stamped or formed sheet metal parts that are joined together. These designs are relatively heavy and expensive and are not very efficient in performing their function of local reinforcement of the panel and effectively transferring the applied loads to the adjacent structure.

SUMMARY OF THE INVENTION

The present invention solves the problems referred to above by a more effective reinforcement component design, utilization and placement of materials within the hood assemblage. The novel reinforcement structure located in the selected areas are connected to the adjacent panel members and are less costly, light in weight but strong enough to permit a more efficient load transfer and thus provide a more effective panel structure.

The present invention comprises an inventive concept employing a frame structure of a relatively light weight base material such as plastic or aluminum and a more rigid, wear-resistant insert such as steel that is strong enough to withstand repeated pounding and readily accept metallic fasteners. In the embodiments illustrated, the invention is used to reinforce the latch and hinge areas. In one embodiment of each of the two different reinforcement areas, the basic frame structure is made essentially of an "egg-crate" or ribbed plastic material and incorporates a wear resistant hard material insert made of steel. In the other illustrated embodiment of the two different reinforcement areas, the base material is a metal, such as aluminum, and also includes an interconnected formed steel member to accommodate a hood latch or hinge member. In the embodiments employing a steel latch plate in conjunction with an aluminum structure, an adhesive layer is applied to the latch plate to avoid galvanic corrosion difficulties and achieve a better strength joint in the critical areas.

In each of the embodiments of the reinforcement structure, there is provided a configuration which is made sufficiently rigid to withstand the loads imposed thereon and transfer such loads into both panel members to which the structure is connected.

BRIEF DESCRIPTION OF THE DRAWINGS

The invention can best be understood when considered in conjunction with the accompanying drawings in which.

FIG. 2A is a view taken along line 2A—2A of FIG. 2;

FIG. 2B is a view taken along line 2B—2B of FIG. 2;

FIG. 7A is a view taken along line 7A—7A of FIG. 7; and

FIG. 7B is a view taken along line 7B—7B of FIG. 7.

DESCRIPTION OF THE PREFERRED EMBODIMENT

Figure 1:
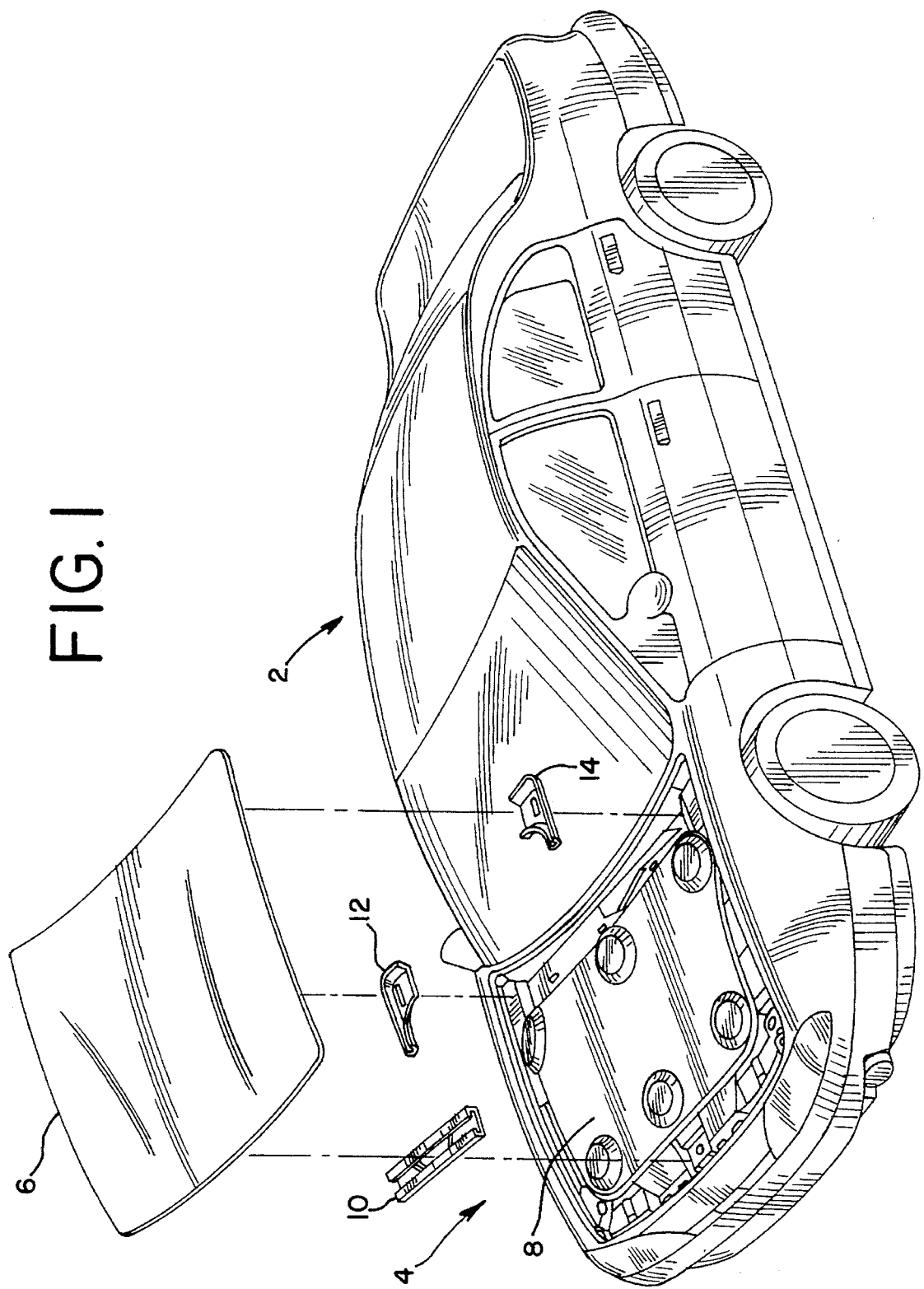
FIG. 1 is a perspective view showing an automobile with the hood assembly in an exploded position with the outer panel member spaced from the inner panel member and the reinforcement members shown in perspective.

Referring to FIG. 1, there is illustrated a automobile 2 and an exploded view of a hood assembly 4 consisting of an outer panel member 6 and an inner panel member 8 that are interconnected in a conventional manner. It is to be appreciated that this invention is applicable to other vehicles, including trucks, busses, etc., which utilize a panel for a closure or the like. Located between, but shown in a spaced relationship from the two panel members, is the latch reinforcement assemblage 10 illustrated in FIG. 2 and a schematically illustrated pair of hinge reinforcement structures 12,14. The details of these items and various embodiments thereof will be described with respect to the remaining drawings. The various reinforcement structures are secured in place between the inner and outer panel members 6,8 to provide structural rigidity to the hood assembly.

Figure 2:
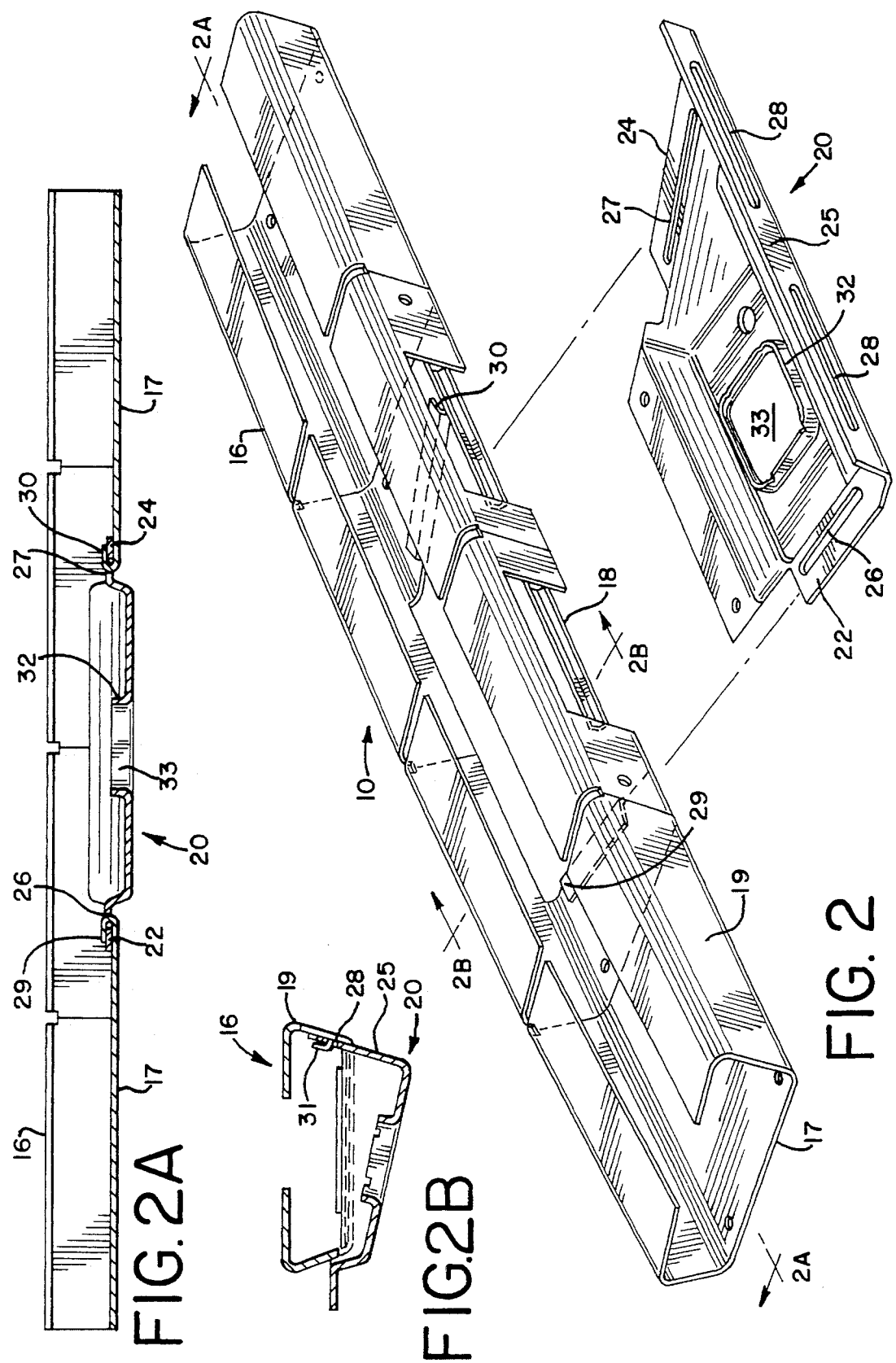
FIG. 2 is an exploded view of one embodiment of a latch reinforcement assembly.

In FIG. 2, there is illustrated one embodiment of a latch reinforcement assembly that is located in the front central portion of the hood assembly 4. This reinforcement assembly is designed to receive a latch member and strengthen this portion of the hood assembly to withstand the forces imposed on the hood during car operation and repeated opening and closing of the hood without unduly or permanently deforming same. The reinforcement assembly functions to provide local wear resistance and local strength and serves to transfer the forces from the latch into the rest of the hood assembly.

The latch reinforcement assembly 10 consists of an elongated generally C-shaped section 16 made of an aluminum formed sheet that is secured to the center portion of the upper panel member 6 by a suitable adhesive and to the lower panel member 8 by an adhesive or is mechanically fastened to the inner panel, for example, by screws or rivets, or both, as desired. The C-shaped section 16 in the embodiment illustrated, extends approximately 10 inches on both sides of the longitudinal center line of the hood. The length of the C-shaped section can be shorter or longer, as desired. Disposed within an opening 18 defined by the bottom central wall portion 17 of the C-shaped section 16 is a generally trapezoidal-shaped reinforcing steel plate 20 having outwardly extending bottom wall portions 22,24 and an upwardly extending wall 25. Formed in the bottom wall portions 22,24 are slots 26 and 27, respectively, and in the wall 25 are located slots 28. The plate 20 also includes an outwardly extending tab 25a disposed generally opposite the upwardly extending wall 25. The tab 25a can include apertures as at 25b by which the tab is connectable to the panel 8. The plate fits into the opening 18 defined in the bottom wall 17 of the C-section and the tabs 29,30 formed from the bottom wall 17 are inserted through slots 26,27, respectively, and bent over as illustrated in FIG. 2A to retain plate 20 in position. Tabs 31 formed in the front wall 19 of C-section 16 fit into slots 28 as shown in FIG. 2B. The central portion of the plate 20 includes a flange 32 that defines a generally square opening 33, which flange 32 is adapted to receive a latch secured to the car frame.

The aluminum construction of the C-section 16 structurally ties the inner and outer hood panels together to effectively transfer the forces from the latch into the rest of the panel, thus permitting an efficient load transfer and sharing between the two panel members. The plate 20, on the other hand, is necessary to handle the local high forces and wear imposed on the hood by the latch member. While not illustrated, sections of the bottom wall 17 of the C-section could be offset outwardly relative thereto to reinforce the bottom wall 17, if desired.

Figure 3:
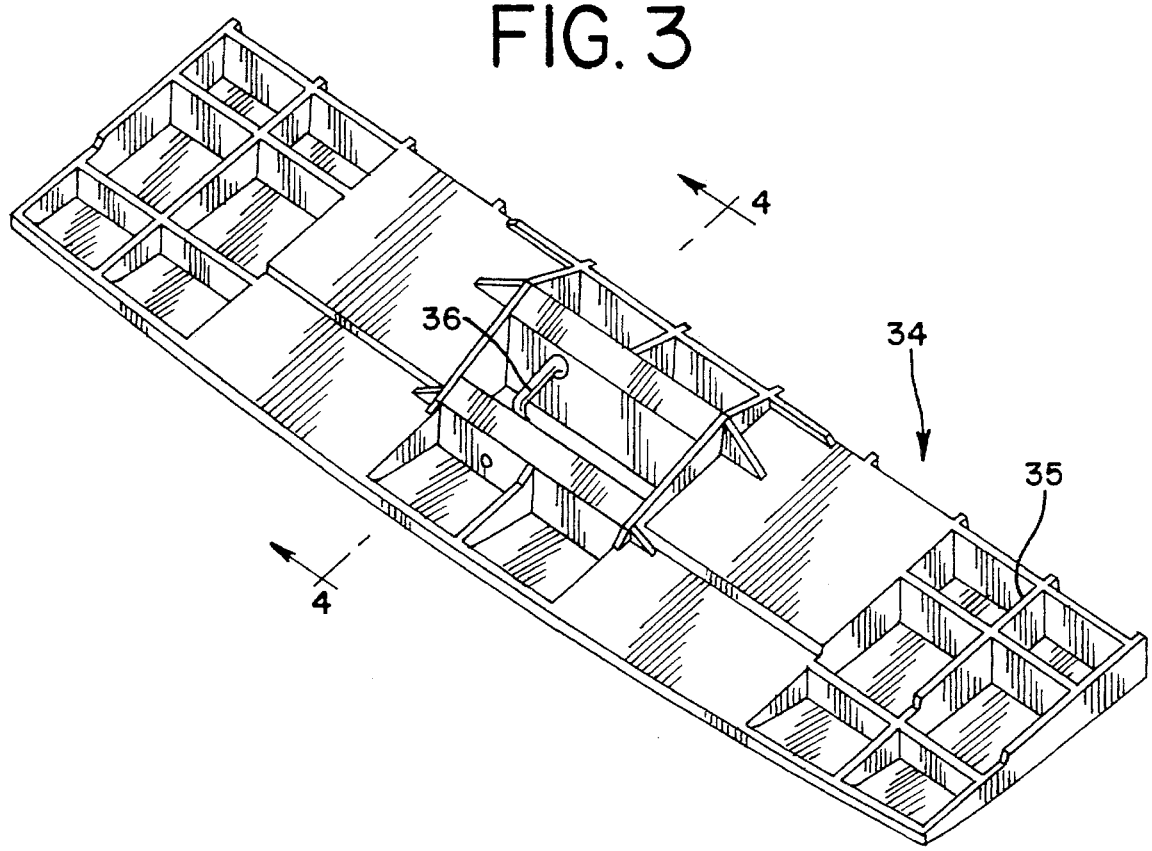
FIG. 3 is a second embodiment of a latch reinforcement assembly.
Figure 4:
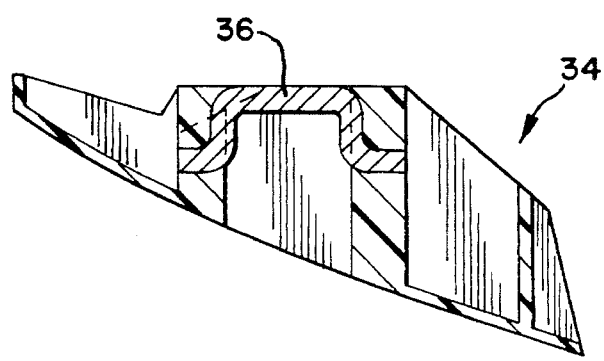
FIG. 4 is a view taken along line 4—4 of FIG. 3.

In FIGS. 3 and 4, there is illustrated another embodiment of a latch reinforcement assembly. This assembly 34 is generally of the same length and width as the embodiment illustrated in FIG. 2, but is lighter in weight in that instead of aluminum it is made of a molded plastic that has an "egg-crate" design consisting of ribs 35 located throughout to provide additional strength to the structure. This latch reinforcement member is secured in place relative to the upper and lower panel members 6,8 by an adhesive or is mechanically fastened by suitable fasteners. This structure acts to efficiently transfer loads received from the latch into the rest of the panel assembly. While the plastic member 34 will transfer the loads, it is not capable of handling the local high intensity loads of a metal latch bearing against plastic, because as the car goes down the road the latch will shake and vibrate and eat itself through the plastic. Thus, a metal piece is required to interface between the latch and the plastic frame structure to provide local wear resistance and strength. To this end, there is provided a striker bar 36 to accommodate a latch and withstand the locally high forces imposed by a latch during the repeated openings and closings of the hood and car vibration. In order to handle this problem with a plastic reinforcement member, the striker bar 36 is molded in situ within the plastic member.

Essentially, the striker bar 36 is put in a die and the molten plastic is injected into it. The plastic flows around the members and freezes against the metal to lock the striker bar 36 in position.

In addition, to the area around the latch, it is desirable to provide a reinforcement member in the hood area where it is hinged to the car body. The hinge reinforcement assembly, which is shown in perspective in FIG. 1, is shown in greater detail in FIGS. 5, 6, 7, 7A, and 7B.

Figure 5:
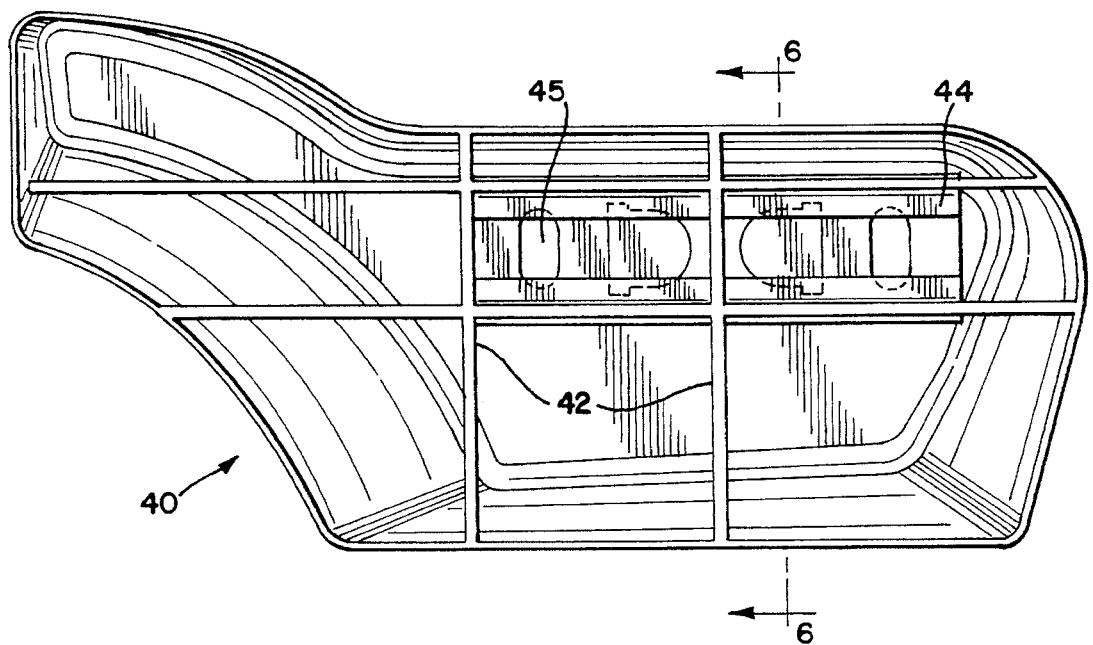
FIG. 5 is a bottom view of one embodiment of a hinge reinforcement assembly.

In the embodiment shown in FIG. 5, the hinge reinforcement member 40 is constructed of plastic having reinforced ribs 42 and includes therein a formed C-shaped steel plate 44. The plate 44 includes openings 45 through which suitable fasteners extend and nuts can be applied in order to mechanically secure the hood hinge to the hood assembly. The steel plate 44 provides a bearing surface for the nuts in place of the plastic, which is highly desirable. The steel plate 44 can be placed in a die and molten plastic injected to lock the plate 44 in situ with the plastic. If desired, the reinforcement member 40 can be adhesively secured to the lower panel member 8. The upper portion of the hinge reinforcement member can also be connected by an adhesive to the underside of the outer panel section 6.

Figure 6:
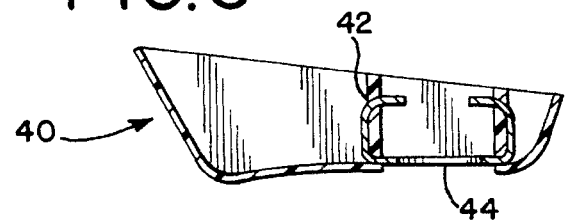
FIG. 6 is a view taken along line 6—6 of FIG. 5.

FIG. 6 illustrates in cross section the steel channel-shaped section which as aforementioned contains the openings and serves as a connector to which fasteners may be connected to retain the hood hinge relative to the panel assembly. The channel section 44 also serves to receive one end of a hinge member (not shown) through which the hinge assembly is interconnected between the car and the hood.

Figure 7:
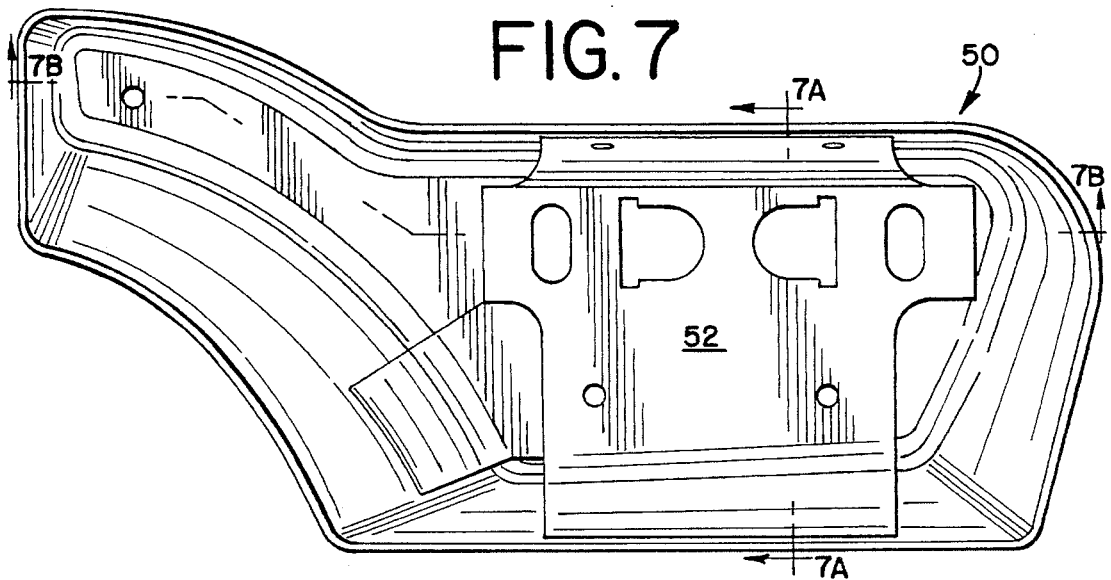
FIG. 7 is a bottom view of a second embodiment of a hinge reinforcement assembly.

In FIG. 7, there is shown another embodiment of the hinge reinforcement member 50. This member 50 is formed of aluminum and is adhesively or mechanically connected to the lower panel member 8. It can also be adhesively connected to the inner surface of the outer panel member 6. There is also included a steel reinforcement member 52 which can better handle fasteners for mechanically connecting the member 50 to the lower panel member 8 and also serves as a member having the necessary strength to connect a hinge member interconnecting the car frame to the hood assembly.

The hinge reinforcement member 50 of FIG. 7 and its connection to the inner and outer panel members is shown in greater detail in FIGS. 7A and 7B.

As illustrated in FIG. 7A, the flanges 50a and 50b are shown adhered to the outer panel member 6 shown in dotted lines by adhesive 54. In the embodiment shown, the bottom wall of the member 50 is adhered by adhesive 56 to the inner panel 8. In addition, the steel member 52 and inner panel 8 are provided with aligned openings 58,60 through which bolts can be disposed for mechanically connecting the steel member 52 and inner panel 8 together. Nuts (not shown) to fit the bolts will bear against the steel plate, thus insuring their retention when the panel members are subjected to high forces.

FIG. 7B illustrates the relationship between the inner metal insert 52 and reinforcement member 50. The insert 52 may be connected to or trapped in position relative to member 50, as desired.

It is intended to cover by the appended claims all modifications that fall within the true spirit and scope of the appended claims.

What is claimed is:

1. A panel assembly used for a car hood assembly comprising inner and outer interconnected sheet members, at least one localized reinforcement structure that is relatively small compared to said sheet members including a frame for absorbing loads imposed thereon and dissipating such loads throughout the panel assembly to help maintain rigidity of the panel assembly, the frame of said reinforcement structure comprises a C-shaped section extending along the front central portion of the panel assembly that is constructed of a base material, said structure also includes a metallic insert that is relatively strong compared to said base material covering a fraction of the area of the base material and interconnected to the base material, which insert defines a flange to receive a hood latch, adhesive means for securing the base material to said outer sheet member and means for securing the frame of said structure and insert to said inner panel member.

2. A panel assembly as set forth in claim 1 in which the C-shaped section is made of aluminum and the insert is constructed of steel.

3. A panel assembly as set forth in claim 1 in which the insert is trapezoidal in configuration and includes tab portions defining slots therein, the C-shaped section also defines a central opening in the bottom portion thereof to receive said insert and means defined by said C-section to interconnect with said slots and tabs to interlock the insert relative to the C-section.

4. A panel assembly as set forth in claim 3 in which the insert includes a flange that defines an opening therein which is designed to receive a latch member.

5. A panel assembly used for a car hood assembly comprising inner and outer interconnected sheet members, at least one localized reinforcement structure that is relatively small compared to said sheet members including a frame for absorbing loads imposed thereon and dissipating such loads throughout the panel assembly to help maintain rigidity of the panel assembly, the frame of said reinforcement structure is an angularly shaped hollow member constructed of a base material, said structure also includes a metallic insert that is relatively strong compared to said base material covering a fraction of the area of the base material and interconnected to the base material, which insert is constructed and arranged to interconnect a hinge member to the car hood, adhesive means for securing the base material to said outer sheet member and means for securing the frame of said structure and insert to said inner panel member.

6. A panel assembly as set forth in claim 5 in which the hollow member is constructed of aluminum and the insert is a steel metal plate conformed to fit the inner surface of said aluminum member and is trapped and connected thereto.

7. A vehicle having a panel assembly used for a vehicle hood assembly comprising inner and outer interconnected sheet members, at least one localized reinforcement structure that is relatively small compared to said sheet members including a frame for absorbing loads imposed thereon and dissipating such loads throughout the panel assembly to help maintain rigidity of the panel assembly, the frame of said reinforcement structure comprising a C-shaped section extending along the front central portion of the panel assembly that is constructed of a base material, said structure also includes a metallic insert that is relatively strong compared to said base material covering a fraction of the area of the base material and interconnected to the base material, which insert defines a flange to receive a hood latch, adhesive means for securing the base material to said outer sheet member and means for securing the frame of said structure and insert to said inner sheet member.

8. The vehicle acccording to claim 7 wherein the C-shaped section is made of aluminum and the insert is constructed of steel.

9. The vehicle according to claim 7 wherein the insert is trapezoidal in configuration and includes tab portions defining slots therein, the C-shaped section also defines a central opening in the bottom portion thereof to receive said insert and means defined by said C-section to interconnect with said slots and tabs to interlock the insert relative to the C-section.

10. The vehicle according to claim 9 wherein the insert includes a flange that defines an opening therein which is designed to receive a latch member.

11. A vehicle having a panel assembly used for a car hood assembly comprising inner and outer interconnected sheet members, at least one localized reinforcement structure that is relatively small compared to said sheet members including a frame for absorbing loads imposed thereon and dissipating such loads throughout the panel assembly to help maintain rigidity of the panel assembly, the frame of said reinforcement structure is an angularly shaped hollow member constructed of a base material, said structure also includes a metallic insert that is relatively strong compared to said base material covering a fraction of the area of the base material and interconnected to the base material, which insert is constructed and arranged to interconnect a hinge member up to the vehicle hood, adhesive means for securing the base material to said outer sheet member and means for securing the frame of said structure and insert to said inner sheet member.

12. The vehicle according to claim 11 wherein the hollow member is constructed of aluminum and the insert is a steel metal plate conformed to fit the inner surface of said aluminum member and is trapped and connected thereto.

\* \* \* \* \*